Figure 1:
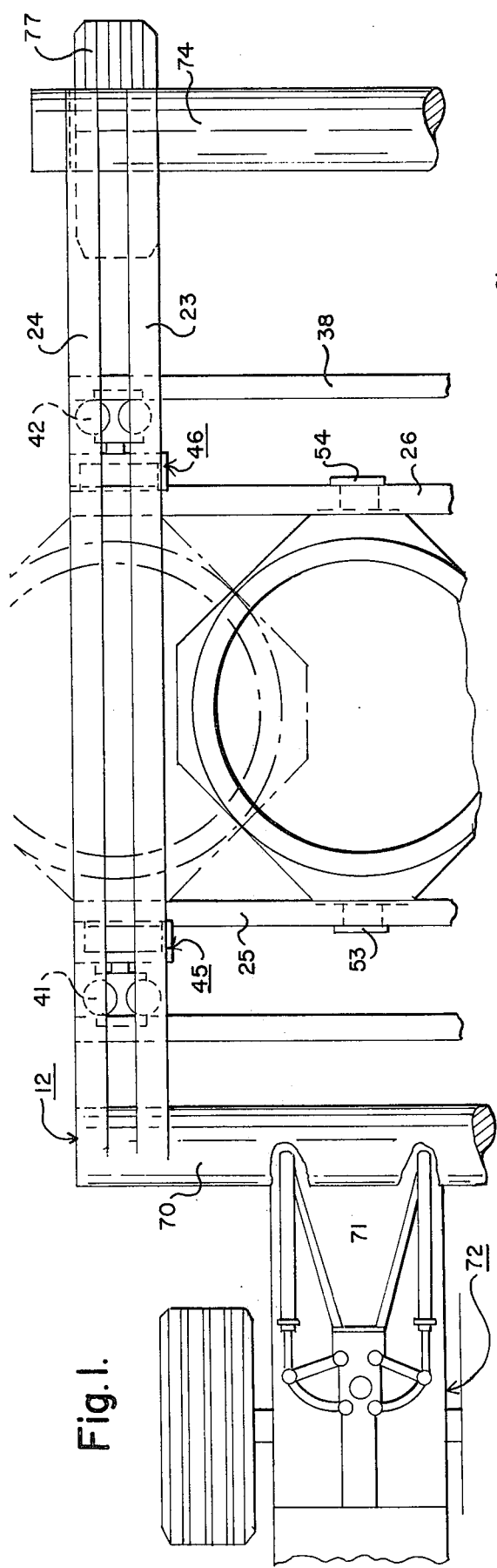

United States Patent [19]

Brock

[11] 4,009,790
[45] * Mar. 1, 1977

[54] SIDE-DUMPING SLAG POT CARRIER

[76] Inventor: Gibson E. Brock, R.D. 5, Persimmon Road, Sewickley, Pa. 15143

[ * ] Notice: The portion of the term of this patent subsequent to Aug. 5, 1992, has been disclaimed.

[22] Filed: Jan. 22, 1976

[21] Appl. No.: 651,537

Related U.S. Application Data

[63] Continuation-in-part of Ser. No. 564,553, April 2, 1975, abandoned, which is a continuation-in-part of Ser. No. 465,864, May 1, 1974, Pat. No. 3,897,881.

[52] U.S. Cl. .............................. 214/317; 214/313; 294/73
[51] Int. Cl.² .......................................... B65G 65/04
[58] Field of Search .......... 214/312, 313, 314, 315, 214/316, 317, 300; 294/67 BA, 67 PC, 73

[56] References Cited

UNITED STATES PATENTS

| | | | |
|---|---|---|---|
| 484,437 | 10/1892 | Kennedy | 214/313 |
| 1,520,047 | 12/1924 | Alden et al. | 214/313 |
| 1,855,862 | 4/1932 | McCann et al. | 214/313 |
| 2,888,157 | 5/1959 | Riley | 214/313 |
| 3,226,783 | 1/1966 | Draxler | 214/707 |

*Primary Examiner*—Robert J. Spar
*Assistant Examiner*—Lawrence J. Oresky
*Attorney, Agent, or Firm*—Buell, Blenko & Ziesenheim

[57] ABSTRACT

A rubber-tired in-plant slag pot and scrap box carrier utilizes a tractor unit and a trailer unit comprising a load-carrying bridge and rear idler wheels, which latter are mounted individually to permit the trailer unit to straddle the load. From the bridge depend hooks which may be carried by a pair of trolleys movable crosswise of the bridge, the hooks being adapted to pick up a slag pot by its trunnions and carry it beneath the bridge. Affixed to the bridge is coupling apparatus adapted to make connection with the trunnions when the hooks raise the slag pot and to tip the slag pot about its trunnions, so dumping out the slag broadside of the carrier.

8 Claims, 4 Drawing Figures

SIDE-DUMPING SLAG POT CARRIER

This application is a continuation-in-part of my application Ser. No. 564,553, filed Apr. 2, 1975 now abandoned, which is a continuation-in-part of my application Ser. No. 465,864, filed May 1, 1974, now U.S. Pat. No. 3,897,881 of Aug. 5, 1975.

That patent discloses a side-dumping carrier for slag pots, scraps boxes and the like carried by the vehicle of my U.S. Pat. No. 3,721,358 of Mar. 20, 1973. That vehicle comprises a tractor unit, a powered and steerable trailing end unit and a load-carrying bridge connecting the tractor and trailing end units and supported by them at each end. This invention utilizes the lifting and dumping mechanism of my U.S. Pat. No. 3,897,881, but a simpler form of bridge and trailing end unit and operates in a different way from either of the carriers above mentioned.

It is the principal object of my invention to provide an in-plant over-the-road slag pot and scrap box carrier that is backed over the load to pick it up but is side-dumping. Other objects of my invention will appear in the course of the description thereof which follows.

My invention utilizes transport apparatus comprising a tractor unit, and a load-carrying trailer supported by the tractor unit at the front end and at the rear end by a pair of unpowered wheels mounted to straddle the load. Otherwise my apparatus is like that of my U.S. Pat. No. 3,897,881.

Figure 2:
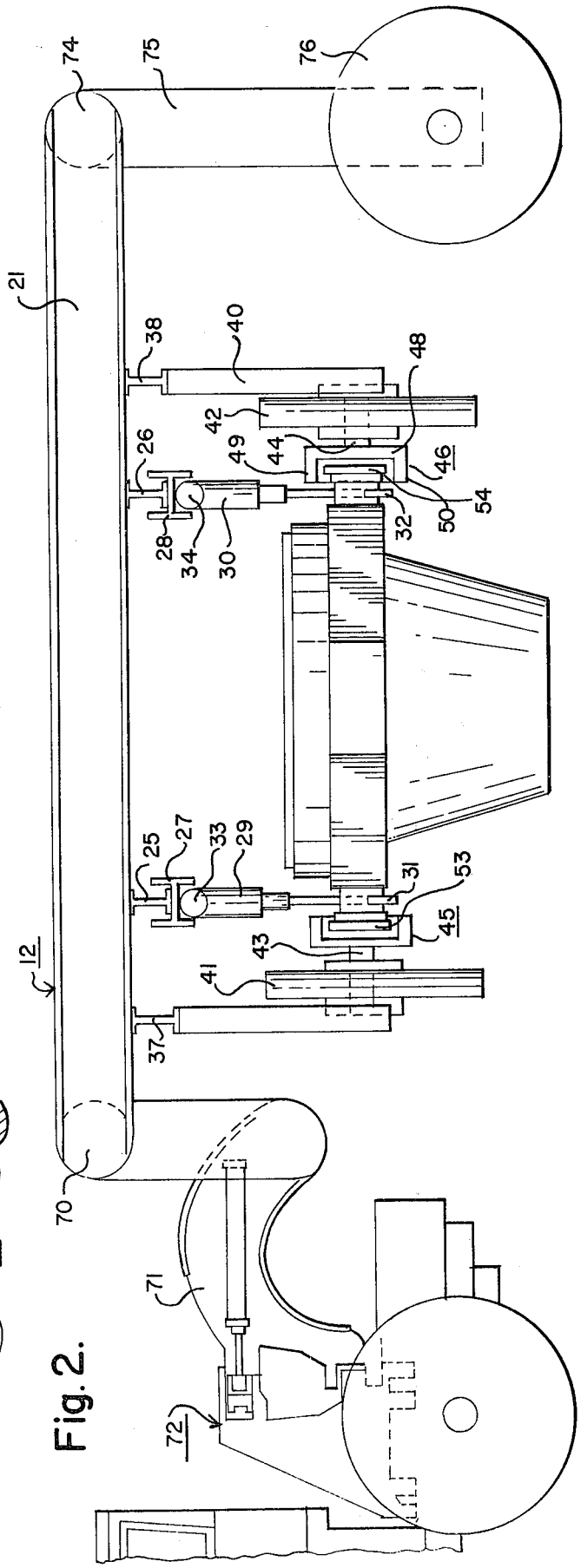
Figure 3:
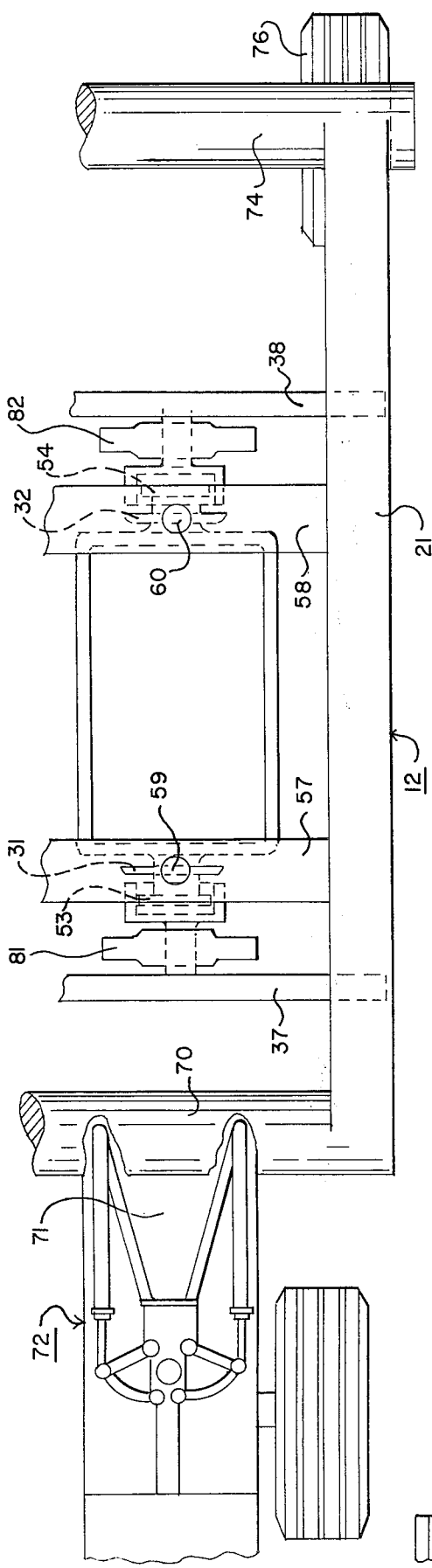
Figure 4:
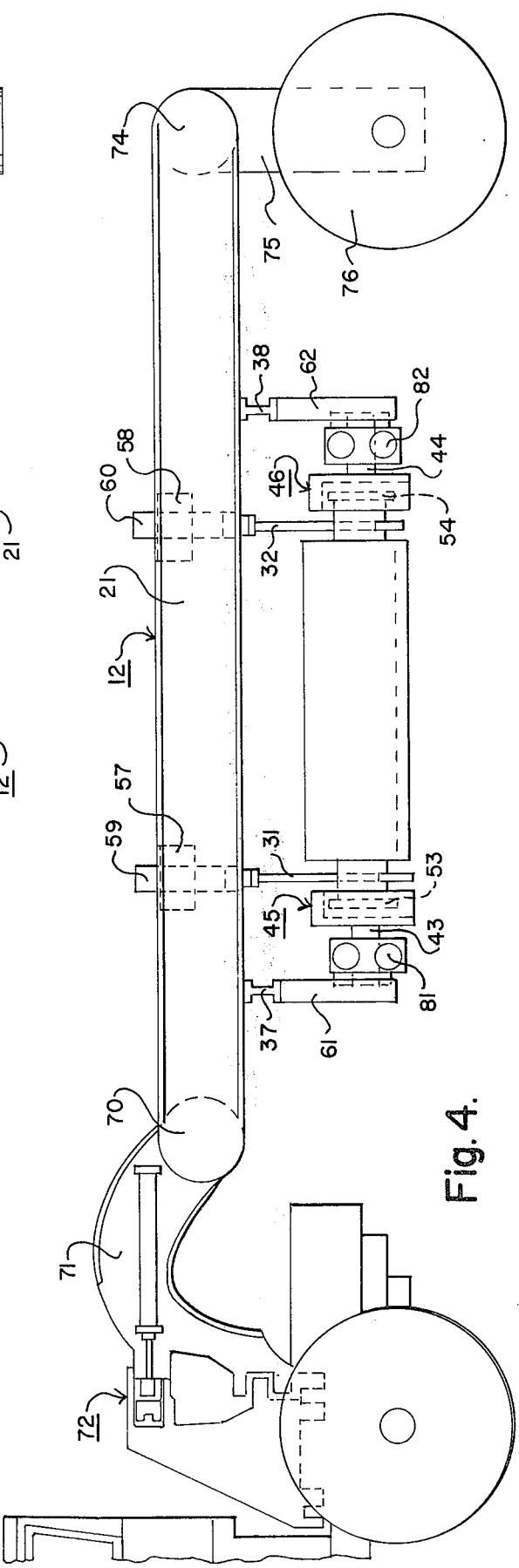

Embodiments of my invention presently preferred by me are illustrated in the attached drawings, to which reference is now made:

FIG. 1 is a plan of a first embodiment of the apparatus of my invention in its traveling position, FIG. 2 is a side elevation of the apparatus of FIG. 1, FIG. 3 is a plan of a second embodiment of my invention in its traveling position, and FIG. 4 is a side elevation of the apparatus of FIG. 3.

My apparatus of my first and second embodiments, illustrated in FIGS. 1–4 hereof is carried by a vehicle comprising, broadly, an elongated load-carrying bridge 12 having at its front end a transverse torque tube 70 from which projects a pull yoke 71. The pull yoke is pivotally mounted on a single axle tractor 72 of the type used for heavy earth moving equipment and the like, and described briefly in my U.S. Pat. No. 3,863,791 of Feb. 4, 1975. As is there explained, the pull yoke 71 is attached to the tractor 72 through a pivot mechanism which permits movement of bridge 12 relative to tractor 72 in both the vertical and horizontal planes, and the vehicle is steered by arcuate movement of the tractor relative to the trailer about their vertical pivot.

Bridge 12 of my first embodiment, illustrated in FIGS. 1 and 2 hereof, utilizes parallel inside and outside I-beams 22 and 24 respectively, spaced apart from each other as draft beams on one side thereof and like parallel I-beams, 21 and 22, spaced apart from each other, as draft beams on the other side thereof. Outside I-beam 21 of that pair is shown in FIG. 2. The rear ends of all four I-beams are attached to rear cross member 74. From rear cross member 74 adjoining beam 21 depends a leg 75, at the lower outside end of which is a cantilevered rubber-tired wheel assembly 76. A like wheel assembly 77 is similarly mounted at the other end of rear cross member 74.

The load lifting and load rotating apparatus carried by bridge 12 is identical with that of my U.S. Pat. No. 3,897.881.

Intermediate their ends and attached to the lower flanges of bridge I-beams 21, 22, 23 and 24 are cross I-beam 25, near upright member 11, and cross I-beam 26, near upright member 13. Those I-beams are spaced from each other a distance slightly less than the end-to-end dimension of the trunnions of a slag pot, and their lower flanges serve as rails for trolleys 27 and 28, respectively. Those trolleys carry depending hydraulic cylinders 29 and 30 respectively, to which are attached hooks 31 and 32 respectively. Those hooks are dimensioned to hold the trunnions of a slag pot. A horizontally disposed hydraulic cylinder 33 is affixed to the lower flange of I-beam 25 at its end below bridge I-beams 21 and 22, with its piston rod attached to trolley 27, and a like cylinder 34 is affixed to the lower flange of I-beams 26 with its piston rod attached to trolley 28.

Intermediate cross I-beam 25 and upright member 11 a cross I-beam 37 is affixed to the lower flanges of bridge I-beams 21, 22, 23 and 24, and intermediate cross I-beam 26 and rear upright member 13 is likewise affixed a cross I-beam 38.; From the end of cross I-beam 38 below bridge I-beam 24 depends a vertical member which, with a brace 40 which extends diagonally downwardly from the other end of I-beam 38, supports a hydraulic rotary torque actuator 42 disposed with its shaft 44 positioned parallel to the bridge I-beams. A like torque actuator 41 is similarly supported below I-beam 37. The torque actuators may be of the type shown in U.S. Pat. No 3,338,140 issued to J. Sheesley on Aug. 29, 1967, or other suitable types. Such actuators, which are commonly used to operate plug valves and the like, utilize one or more pairs of opposed hydraulic cylinders the piston rods of which are connected by a toothed rack. Movement of the rack rotates a pinion attached to a shaft to be turned.

Shaft 43 of rotary torque actuator 41 is fitted at its rearward-facing end with a coupling 45 and shaft 44 of rotary torque actuator 42 is fitted at its forward-facing end with a like coupling 46. Each coupling is merely an approximately square piece of a channel having an upright web 48 affixed to its respective shaft, midway between oppositely facing flanges 49 and 50. One end of the channel is provided with a closed end 51; the other end is open. To the outer end of one trunnion of a slag pot is affixed a square plate 53 with a pair of opposite sides disposed horizontally when the slag pot is upright. The plate is dimensioned so that those sides fit between opposite flanges 49 and 50 of coupling 45 or 46. A like plate 54 is affixed to the outer end of the other trunnion of the slag pot. Rotary torque actuators 41 and 42 are positioned vertically so that plates 53 and 54 fit into couplings 45 and 46 when the slag pot is raised above ground and moved into its dumping position.

The operation of my apparatus as concerns the maneuvering of the carrier vehicle over a load is not the same as that of my U.S. Pat. No. 3,897,881. As rear wheel assemblies 76 and 77 are not powered and are not rotatable about a vertical pivot, the carrier vehicle cannot approach the load broadside. Instead, the carrier is backed toward the load. It is not, however, necessary to back the carrier crosswise of the charging aisle to pick up a slag pot, as must be done with the vehicles of the prior art. Those vehicles pick up a slag pot with its trunnions at right angles to the long axis of the vehicle. As my carrier picks up a slag pot with its trunnions parallel to the long axis of the vehicle, it is backed toward the load at a relatively small angle to a line through the load trunnions until an imaginary point midway between wheel assemblies 76 and 77 is on the longitudinal center line of the load. In the case of a slag pot or a scrap box provided with trunnions the center line is the line through the trunnions. The open sides of hooks 31 and 32 face those trunnions, and torque actuators 41 and 42 their associated load-rotating apparatus are at the side of bridge 12 away from the load. Prior to backing the trailer unit over the load the pick up cylinders 29 and 30 and hooks 31 and 32 carried by trolleys 27 and 28 are positioned at the side of the bridge 12 adjacent to the torque actuators by admitting hydraulic fluid to cylinders 33 and 34. The hooks are then lowered to the trunnion level and moved toward the trailer center line to engage the trunnions. If the hooks are not properly aligned with the trunnions the tractor 72 is moved forward or backward until proper alignment of hooks and trunnions is achieved. The remainder of the pick up operations are identical with those of my U.S. Pat. No. 3,897,881.

Bridge 12 of my second embodiment, which is illustrated in FIGS. 3 and 4, hereof, is identical in all respects except two with bridge 12 of FIGS. 4, 5 and 6 of my U.S. Pat. No. 3,897,881. Like my first embodiment, which has been described, the rear cross member 74 of my second embodiment is supported by individual rubber-tired wheel assemblies 76 and 77. No cross-axle connects the wheel assemblies, so that they can straddle a load. The hydraulic torque actuators 81 and 82 are mounted with their cylinders crossways as shown in FIGS. 3 and 4 rather than vertical, so as to increase the load clearance of the trailer unit. This change makes no difference in the load lifting and rotating operation of the apparatus carried by bridge 12, which apparatus operates in the same way as that of my patent above mentioned.

While my apparatus above described may be maneuvered over a load in the same manner as the apparatus of my first embodiment, it is peculiarly adapted to pick up relatively narrow loads, such as scrap boxes, that can be straddled by rear wheel assemblies 76 and 77 and which are cleared by the hydraulic torque actuators 81 and 82. In this operation tractor unit 72 is handled in a somewhat different fashion. Hooks 31 and 32 are first raised to clear the load. The vehicle is then backed over the load until hooks 31 and 32 are vertically aligned with the scrap box trunnions. Tractor unit 72 is then turned at right angles to the trailer vehicle and driven to swing the trailer in an arc around the imaginary point midway between wheel assemblies 76 and 77 as a pivot point, until hooks 31 and 32 are clear of the scrap box trunnions. The hooks are then lowered to the level of the trunnions and the trailer is swung back again to its original position, in which the hooks now properly engage the scrap box trunnions. If the hooks are not properly aligned with the trunnions, the tractor 27 is turned back by its steering mechanism into line with the bridge 12 and moved forward or backward until proper alignment of hooks and trunnions is achieved. It is then returned to its right angle position and driven to bring hooks 31 and 32 into proper engagement with the load trunnions.

It will be apparent to those skilled in the art that bridge 12 may be constructed of sections other than I-beams, and that those sections may be box sections or beam sections which are stronger at the center of the span to achieve more uniform stress in the material. It will be also apparent that the torque actuators may be replaced by torque levers and cylinders or with cylinders and linkage similar to the single axle tractor steering mechanism.

In the foregoing specification I have described presently preferred embodiments of my invention; however, it will be understood that my invention can be otherwise embodied within the scope of the following claims.

I claim:

1. A rubber-tired vehicle for plant roadway and off highway carriage of heavy loads comprising a tractor unit and a trailer unit comprising an elongated load-carrying bridge supported at its front and rear ends by the tractor and a pair of wheels respectively, means for picking up and dumping a slag pot or the like provided with trunnions comprising a pair of hook means suspended from the bridge and spaced from each other longitudinally thereof, coupling means affixed to the bridge in a vertically and horizontally fixed position relative thereto and adapted to make connection with the slag pot trunnions while it is suspended above ground in the hook means, means for raising and lowering the hook means relative to the coupling means, and means for rotating the coupling means so as to tip the slag pot about its trunnions in the hook means, whereby the trunnions are elevated into position in which said coupling means are coupled to said trunnions prior to the dumping of said slag pot, the pair of wheels supporting the rear end of the trailer being idler wheels individually mounted to straddle a load.

2. Apparatus of claim 1 in which the coupling means are affixed to the bridge intermediate its sides.

3. Apparatus of claim 1 adapted for picking up and dumping a slag pot having a non-circular trunnion end and in which the coupling means are adapted and adjusted to mate slidingly with the non-circular trunnion end from above by relative movement therebetween in a transverse vertical plane when the hook means are raised relative to the coupling means from a position below them.

4. Apparatus of claim 1 including a pair of trolleys disposed for movement transversely of the bridge, and means for moving the trolleys, each hook means being carried by a trolley.

5. Apparatus of claim 4 in which the coupling means are affixed to the bridge at one side thereof.

6. Apparatus of claim 5 in which the hook means in their pick-up position open away from the coupling means.

7. Apparatus of claim 4 adapted for picking up and dumping a slag pot having a non-circular trunnion end and in which the coupling means are adapted and adjusted to mate slidingly with the non-circular trunnion end from the side by relative movement therebetween in a transverse vertical plane when the hook means are moved laterally toward the coupling ameans in line therewith.

8. Apparatus of claim 1 in which the tractor unit is a single axle unit.

* * * * *

UNITED STATES PATENT OFFICE
CERTIFICATE OF CORRECTION

PATENT NO. : 4,009,790
DATED : March 1, 1977
INVENTOR(S) : GIBSON E. BROCK

It is certified that error appears in the above-identified patent and that said Letters Patent are hereby corrected as shown below:

Column 1, line 58, the numeral "22" should read --23--.

Column 4, Claim 7, line 61, "ameans" should read --means--.

Signed and Sealed this

Third Day of May 1977

[SEAL]

Attest:

RUTH C. MASON
*Attesting Officer*

C. MARSHALL DANN
*Commissioner of Patents and Trademarks*